Aug. 8, 1933.   H. F. FLOWERS   1,921,917
YIELDING DOOR MECHANISM
Filed Nov. 1, 1929   5 Sheets-Sheet 4
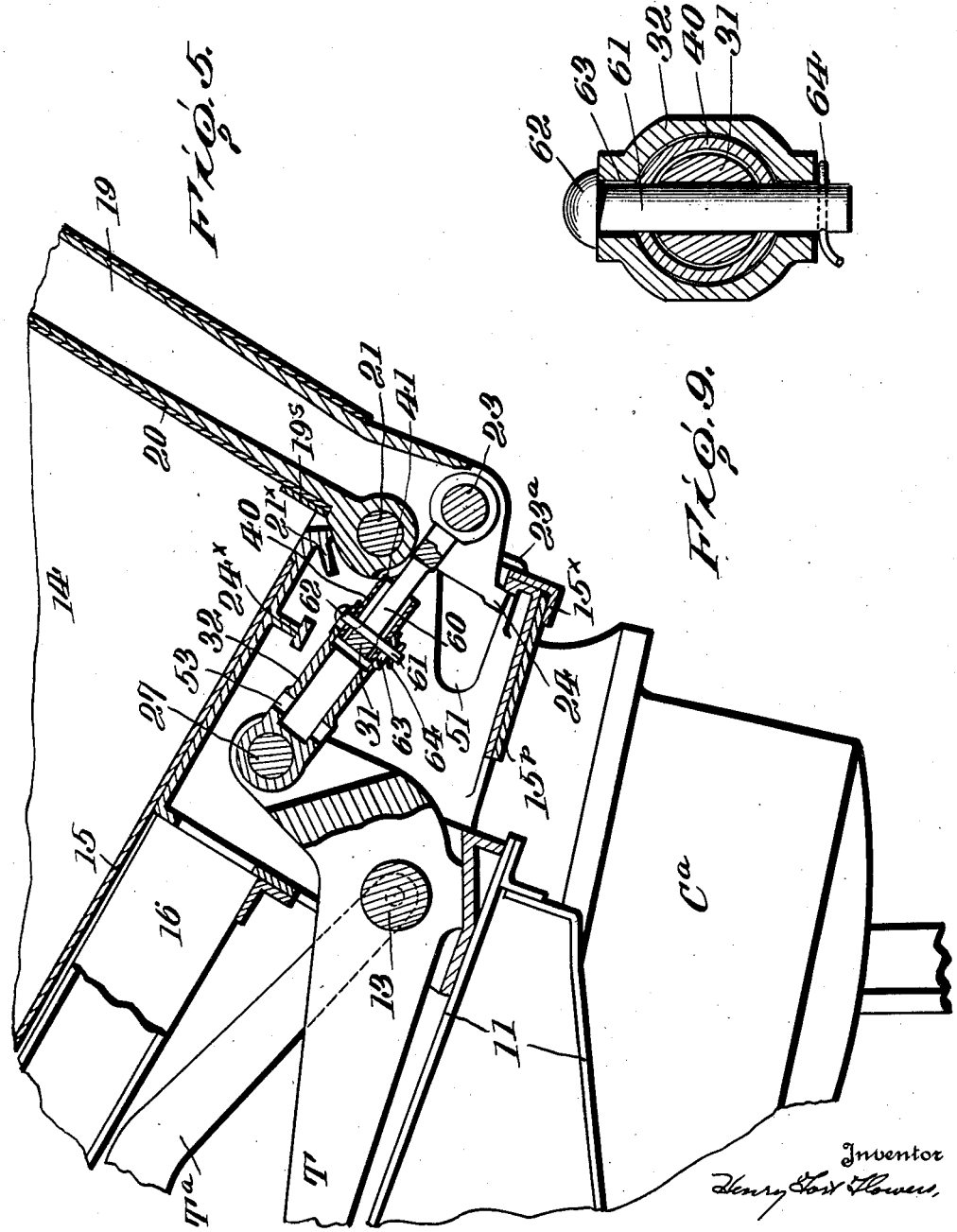

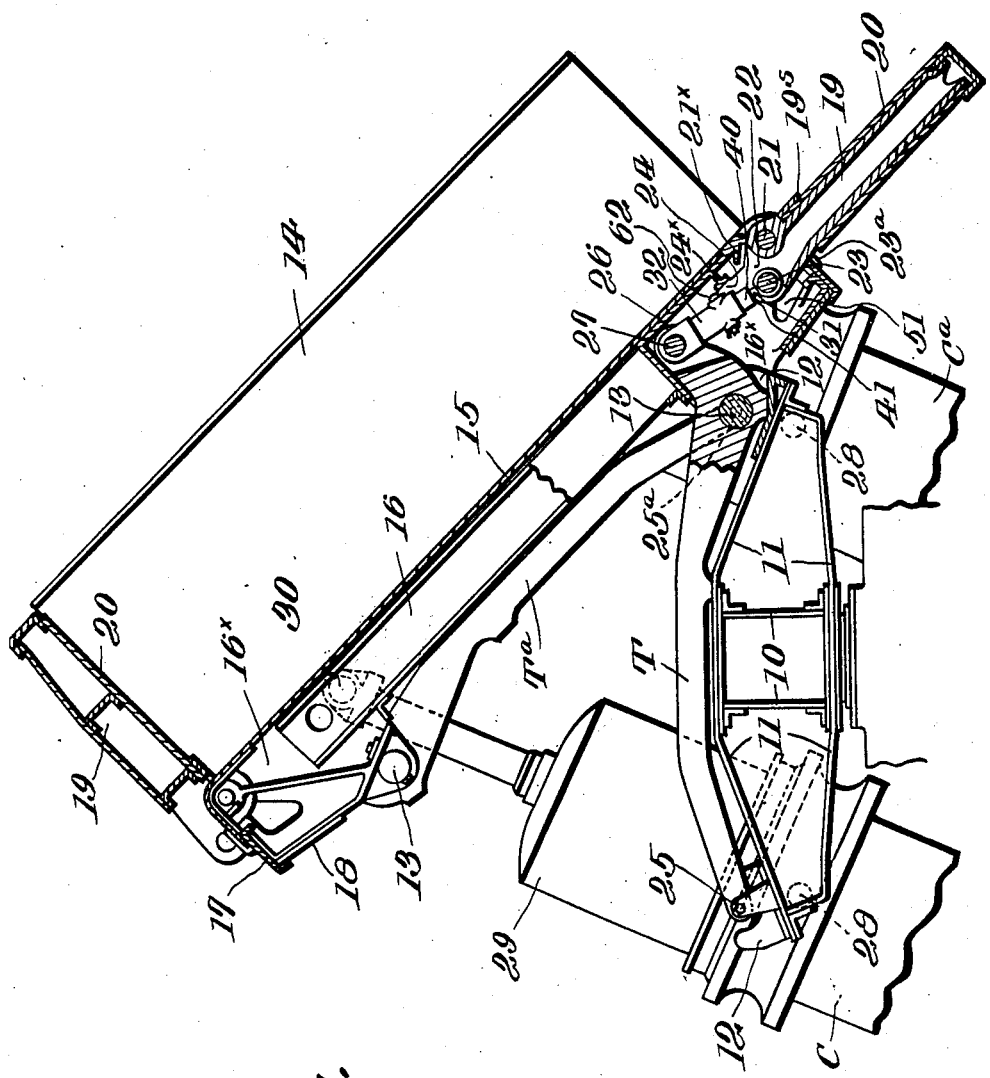

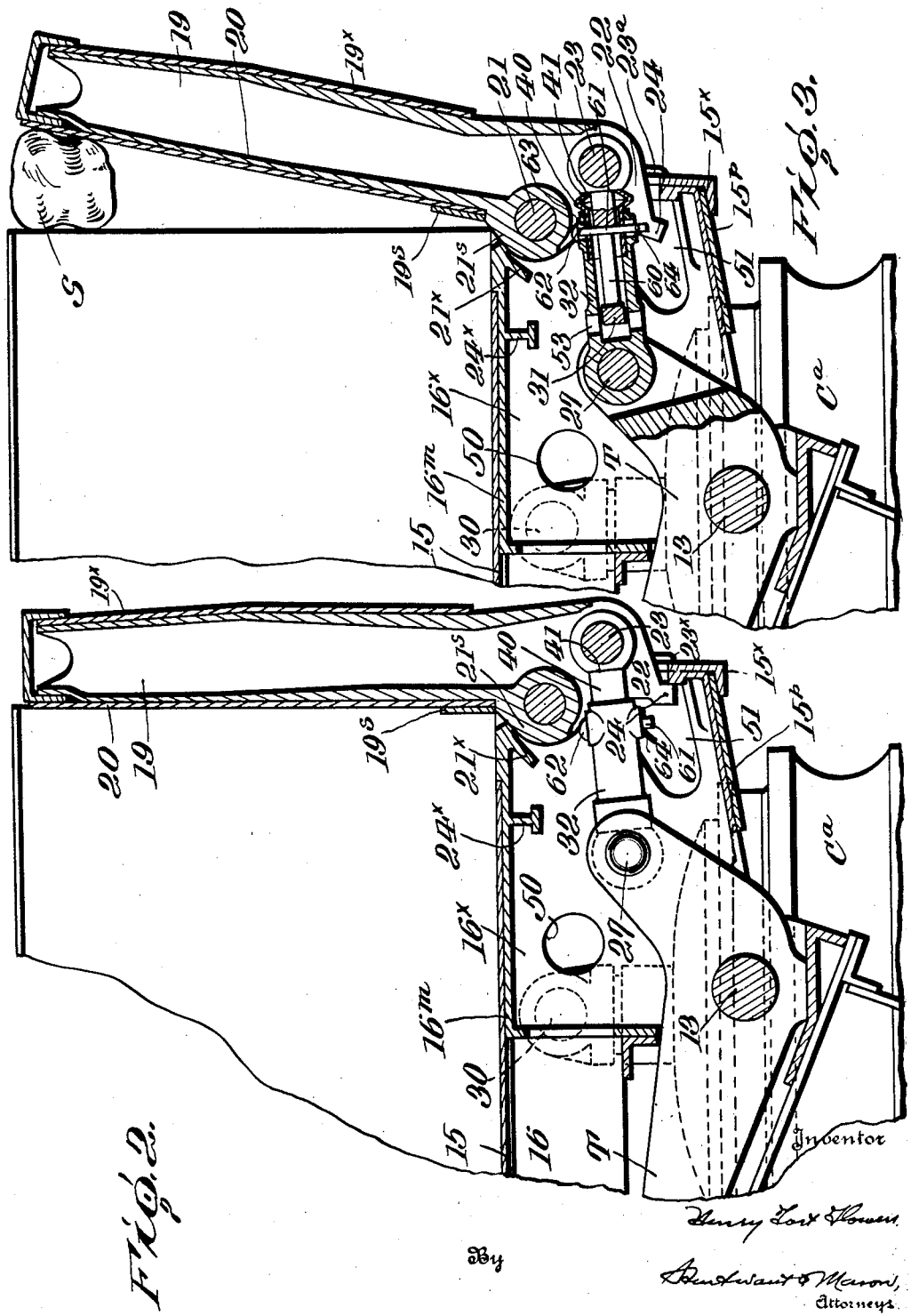

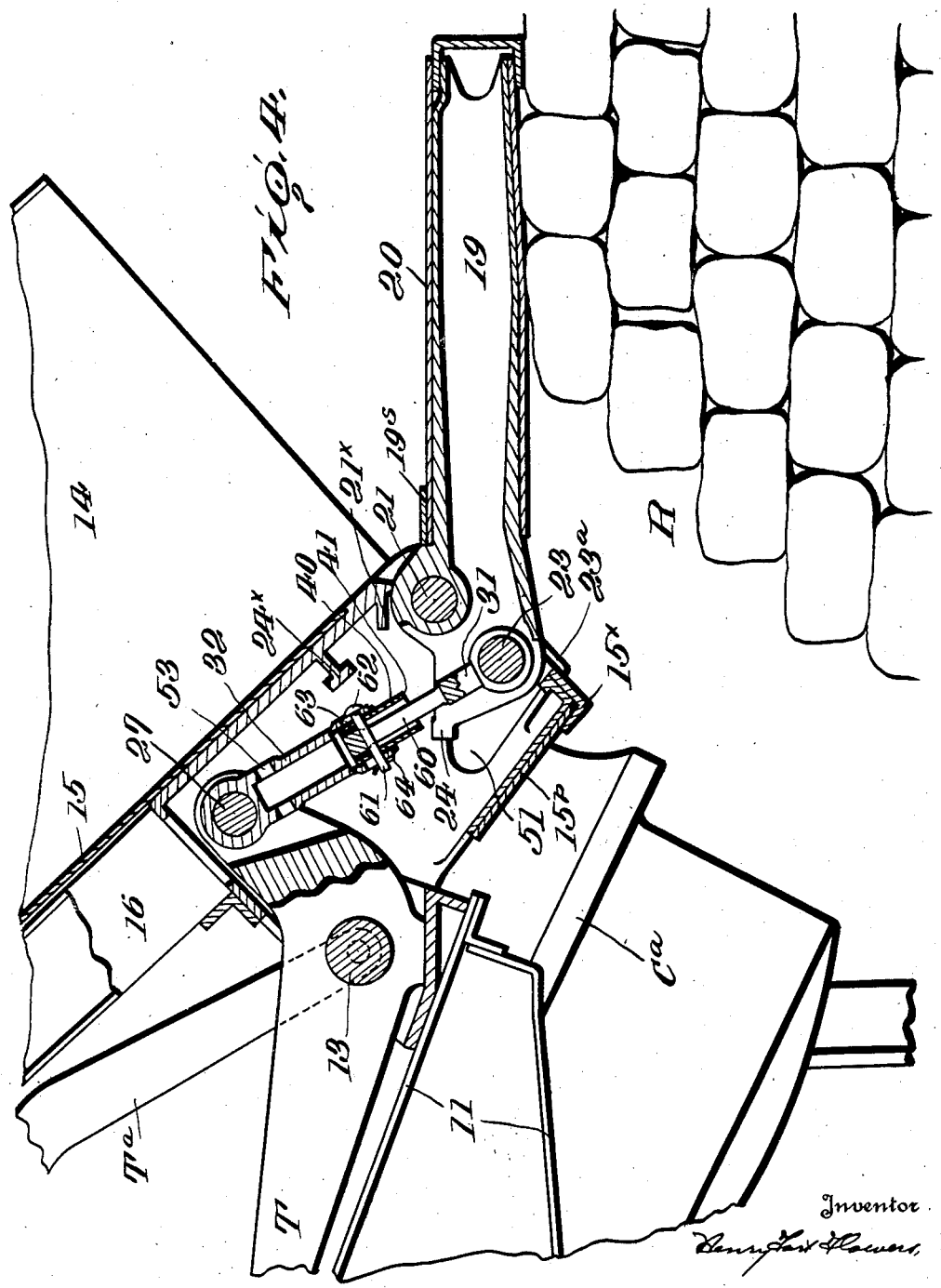

Aug. 8, 1933.  H. F. FLOWERS  1,921,917
YIELDING DOOR MECHANISM
Filed Nov. 1, 1929   5 Sheets-Sheet 5
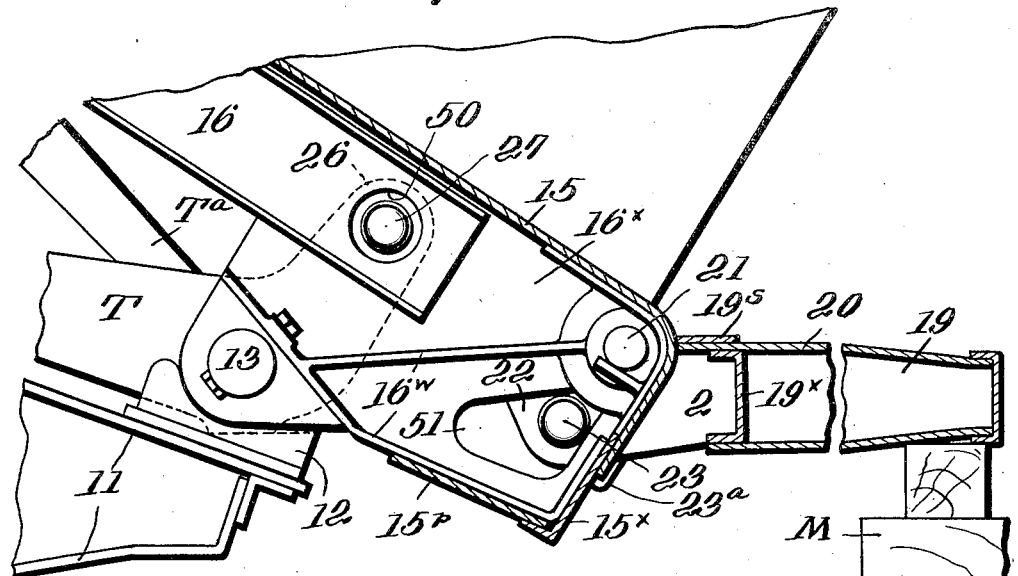
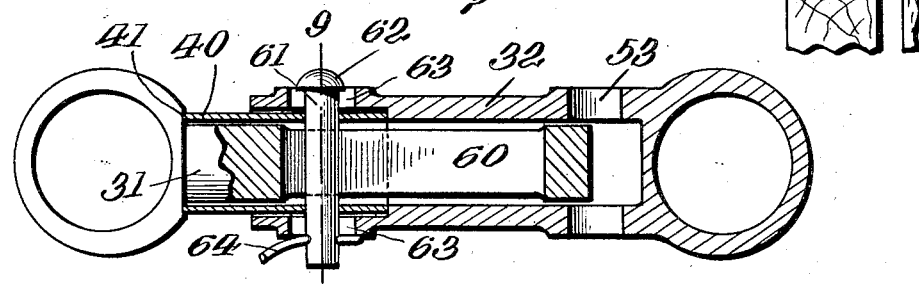
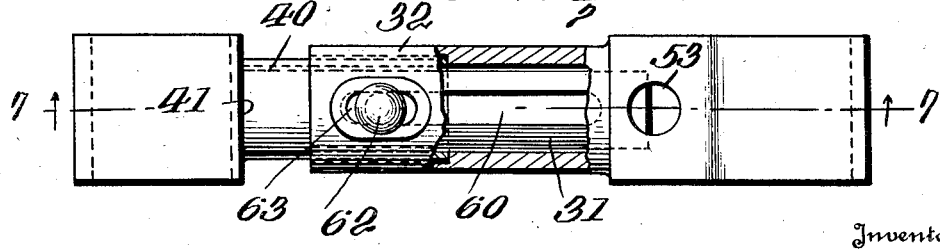

Patented Aug. 8, 1933

1,921,917

UNITED STATES PATENT OFFICE 1,921,917

YIELDING DOOR MECHANISM

Henry Fort Flowers, Findlay, Ohio

Application November 1, 1929. Serial No. 404,008

11 Claims. (Cl. 105—276)

This invention relates to improvements in dump vehicles, and more particularly concerns the door operating and controlling mechanisms for such vehicles.

The improvement in such vehicles according to the present invention are applicable to any type of vehicle having a dump body with a side door, in which the dump body and door are connected with one another and with the frame so that the door opens during a tilting or rocking of the body relative to the frame, and particularly concerns a door controlling system of this type in which: (a) the door is free to close relative to the body if it encounters an obstruction during the tilting of the body; (b) the door control device includes a sacrifice element which will yield, for example, upon the closing of the door if the door is blocked against a complete closing movement, or in a similar contingency, and (c) the door is given a positive opening movement during the tilting of the body, so that in the event the load of material is frozen and adheres to the body and door, the door is positively pulled toward open position.

In my Patent No. 1,611,012 granted Dec. 14, 1926, a vehicle is disclosed in which the body is supported in stable equilibrium during normal transport and no latches are employed to maintain the body in this position. A similar type of support is shown in the illustrative form of disclosure herein, together with an application of the present invention to a door controlling mechanism of type analogous to that disclosed in the said patent.

In my copending applications Ser. Nos. 100,576 and 100,577 filed April 8, 1926, constructions have been disclosed in which the door is permitted to make a relative closing movement with respect to the body, whereby parts of the structure are saved from breaking by this relative closing of the door.

In my application Ser. No. 275,759 filed May 7, 1928, now United States Letters Patent 1,749,-530 of March 4, 1930, a yielding door mechanism is shown in which a sacrifice member is provided to guard against the contingency of an attempted closing of the door during the return of the body, when the door is blocked against a complete closing movement.

The present invention relates to further improvements in such devices, and particularly concerns a type of door operating control in which the above noted features are provided.

When the body is tilted to provoke a dumping and the door opens, the permissive movement of the door by reason of its weight and the weight of the load thereagainst, will permit the door to move to the dumping position, but without preventing a yielding or relative closing movement of the door with respect to the body in the event it encounters some obstacle to its controlled rocking with the body. During the return movement of the body to the transport position, the elements produce a positive closing of the door, but a sacrifice member is provided which preferably will at first yield resiliently and later by distortion, whereby breakage of major elements of the structure is avoided. Further, the door control system is so constructed that in the event of a sticking of the door, for any reason, so that it does not open by its own weight and the weight of the load, again a positive opening movement is given to the door structure with respect to the body.

An illustrative form of construction according to the present invention, set forth by way of example as applied to a railway dump car, is described hereinafter and shown on the accompanying drawings, in which:

Figure 1 is a transverse section through a dump vehicle, with the body tilted and the door fully open.

Fig. 2 is a corresponding section, on a larger scale, showing the body in transport position and the door closed.

Fig. 3 is a view similar to Fig. 2, but showing the door prevented from closing, and representing the sacrifice member as distorted.

Fig. 4 is a view similar to Figs. 2 and 3, but with the dump body tilted and showng the door prevented from moving to its fully open position of Fig. 1.

Fig. 5 is a view similar to Figs. 2, 3 and 4, with the dump body tilted, and showing the positive opening of the door.

Fig. 6 is a similar view, with the parts in position for removing or replacing the door operating link.

Fig. 7 is a sectional view of the link, substantially on line 7—7 of Fig. 8.

Fig. 8 is a top plan view of the link, with parts broken away for clearness of description.

Fig. 9 is a sectional view on line 9—9 of Fig. 7.

On the drawings, a vehicle frame represented as the longitudinal car beam 10 carries transverse bolsters or straddle members 11, having brackets 12 at their outer ends to receive the fulcrum pins 13 mounted on the car body 14. The car body has a floor 15 with reinforcing transverse irons 16 and gusset plates or castings 16x, the floor 15 being downwardly turned at the sides to form a skirt 17 with longitudinal reinforcing irons 18 attached thereto. From point to point of this downwardly turned skirt 17 of the car floor are provided slots to receive the door members 19 which support the door plates 20. The door members 19 are mounted on hinges 21 carried by the body, but extend downwardly with a normally depending portion 22 below the body hinge 21 to support the removable door operating pivot pins 23 and a lug 24, the purposes of which will be set forth hereinafter.

Likewise connected to the frame and body are the transverse links T, Ta which extend from a pivot connection 25, 25a on the frame (shown as coaxial with pivot pins 13, 13 in the transport position) across the frame to the other side thereof, and are pivoted to the body in the line of the axis of the pin 13 at the opposite side, and preferably on this pin itself. Each of these links T, Ta has an end 26 extending beyond the respective pivot 13 and carrying a removable pivot bolt 27.

The frame also carries bearings to receive the trunnion members 28 of a pair of power cylinders C, Ca, these trunnions also being located substantially in the vertical plane of the pivots 13, 25 and 13a, 25a, and being provided with the extensible cylinders and pistons 29 to exert an action against the pivot 30 of the car body. It will be understood that any suitable raising device may be employed, but the present structure has been indicated conventionally, as that described in my copending application Ser. No. 66,791 filed on Nov. 4, 1925, to which application reference is made for the details of construction and operation.

When the power unit C for example is energized, an upward thrust is exerted upon the left hand side of the body in Fig. 1, whereby the body rocks about its right hand fulcrum line 13, 25a, into a position such as illustrated in Fig. 1. The transverse link T remains relatively fixed with the frame, while the transverse link Ta moves with the body. The pivot pin 27 of the link T therefore remains stationary relative to the frame, and by reason of the movement of the body, there is a relative movement between the body and the pin 27. The weight of the load and of the door itself causes the door to swing downward in a clockwise direction in Fig. 1, finally reaching the position shown therein in which it is parallel to and substantially in prolongation of the floor 15 of the car body, thus serving as a chute for the discharge of the material and permitting the delivery of the latter well beyond the wheels of the vehicle. During this downward gravitational movement of the door about its pivot 21, the pivot 23 on the depending arm 22 of the door exerts a thrust or compressional effort against the sacrifice member 40, and thereby upon the outer sleeve 32 and finally against the pivot 27; these parts thus serving to limit and control the downward or opening movement of the door. It will be noted that the link 32 is free to pivot about the pins 27 and 23 during this movement to accommodate itself to the changing relative positions of the door, body and frame. Finally, the face of the lug 24 which is directed upwardly in such inclined position of the door 19, 20 is brought against a stop 24x fixed on the car floor 15, thus determining the limit position of the door in its downward rocking movement.

Meanwhile, the link Ta has remained with the body 14, and by reason of the coaxial relationship of the pivots 13, 25a, this link has permitted no movement of the upper door 19, 20, being the door at the side opposite the fulcrum selected for tilting, so that this door has remained closed: and by reason of the relationship of the parts, it will be held closed during the return from tilting and during the normal transport of the vehicle.

When the power unit C is permitted to collapse, the body rocks downward to its normal transport position under the influence of gravity. During this returning movement of the body, the downward and outward thrust along the line of the links 31, 32 causes a rocking movement of the door about its body pivot 21 and a return of the door to the closed position of Fig. 2.

If during the opening movement of the door, it encounters an obstacle such as the rock pile R (Fig. 4), the door is prevented from movement and simply rocks on its body pivot 21 with respect to the body 14 into the position shown in Fig. 4, for example. During this movement, the inner link member 31 extends with respect to the hollow link member 32, as shown, so that the body moves freely without any blocking action by the door 19, 20. This relative stoppage or closing of the door with respect to the body is immediately apparent to the operator, both by observing the door itself, and by perceiving the difference in the discharge of material occasioned thereby, so that the operator is enabled to stop the raising of the body, if he so desires, and permit it to return slightly for the removal of the obstacle. In any event, there is no breakage of any part of the construction, by reason of this permissive closing of the door relative to the body.

When the power unit is released, the body will return and the links 31, 32 will telescope until they are again seated with respect to each other, whereupon the body will act in the normal way through bar T to close the door to the position shown in Fig. 2.

It will be noted that the outer link or sleeve member 32 is provided with an enlarged bore to receive the sacrifice member 40 which is shown as a crushing tube, which in the closed position of the door (Fig. 2) fits against a shoulder 41 on the inner link member or pin 31, so that the entire forcing stress between the transverse arm T and the door 19, 20, is passed through the crushing tubes 40 of the several door operating elements, it being understood that any desired number of these may be located along the length of the car.

The inner telescoping member or pin 32 is provided with a slot 60 to receive a pin 61 having an enlarged head 62 bearing against the outer surface of the sleeve 32 and passing through slots 63 cut through the wall of this telescoping member or sleeve 32 adjacent its free end. The pin 61 likewise passes through holes in the portion of the sacrifice member 40 which is located within the sleeve 32, and is perforated to receive a cotter pin 64 which prevents it from displacement out of the telescoping sleeve 32.

If during the return movement of the body and door toward the closed and transport positions, an obstruction of any kind exists between the door and the body so that the door cannot return to its normal closed position, such for example, as the stone S of Fig. 3, then the door will be prevented from further movement with respect to the body, but owing to the body movement with respect to the frame and the link T, a continued outward forcing action occurs between the pivots 27, 23 along the line of the links 31, 32 and the sacrifice member 40. As a result of this forcing action, the sacrifice member at first yields resiliently within its own elastic limit, and this effect is immediately observable by the operator of the vehicle, so that ordinarily the movement of the body may be stopped before any permanent distortion or deformation of the sacrifice member occurs. If, however, the body is not so stopped, the ductility of the material of the member permits a permanent deformation of this member with a still further yielding under the forcing action.

When one or more of the sacrifice members 40 has been permanently distorted in this manner, it can be easily and quickly replaced by bringing the car alongside a suitable support such as the pile of timbers M in Fig. 6, and the proper power cylinder C is then operated to cause a tilting of the body until the pin 27 is opposite the hole 50 in the beam 16, and the pin 23 is opposite the hole 51 in the gusset plate. Since the door 19, 20 is now supported by the timbers M, the radial strain is removed from these pins, and they may be driven out of their corresponding openings, whereby the entire link assembly of pin 31, sleeve 32 and the distorted sacrifice member 40, still held together by the pin 61, may be removed from the space beneath the car floor.

The telescoping system comprising the outer tube or sleeve 32, the inner pin 31 and the sacrifice member 40, along with the connecting pin 61, are now entirely released from any connection with the body of the door and may be removed from the vehicle. The cotter pin 64 is withdrawn and pin 61 pulled out: the members 31 and 32 are separated, and the crushing tube 40 withdrawn and a new tube 40 substituted. The members are now assembled and replaced in position. Pins 23, 27 are driven back: and the door and body are now ready for normal action again. It will be noted that the ends of the pins 23, 27 and the inner edges of the apertures 50, 51 are beveled so that the pins guide themselves into their proper position, and since these pins are normally under stress during operation, there is no tendency toward sliding out of the holes 50, 51 except when the door is blocked up, as shown in Fig. 5, and the pins are opposite the respective apertures.

In some instances, it is found, during the actual employment of vehicles of this type, that the door sticks, so that it does not drop open by its own weight and by the weight of the load against it. This may happen when a load of wet ore is shipped in very cold weather, and the ore freezes into a solid mass adhering closely to the body bottom and to the door, so that the door is prevented from its usual free swinging. In such event, the door remains in its closed position with respect to the body during the beginning of the dumping movement of the body. This results in the pin or inner telescoping member 31 pulling relatively out of the outer tube or sleeve 32, this movement being permitted by the free engagement of the pin 61 in the slot 60 of the inner telescoping member 31. At a time determined by the length of this slot, the pin establishes a positive connection between the outer telescoping member 32 and the inner pin 31 (Fig. 5), so that now a strain is brought to bear from the pivot 27 through the sleeve 32, pin 61, pin 31 onto the pivot 23, tending to move the door toward the open position. It is preferred to have the pin 61 adapted for a slight relative movement in the sleeve 32, by the provision of the slot 63; but ultimately the strain will be transmitted between these members as indicated, and the door will be pulled open so that the load is now poised ready for discharging. In many instances, the weight of the load when the body is at its full inclination will permit the entire load to slide out, while in other instances it is necessary to assist it by striking with bars or sledges. In any event, it will be noted that the dump car is free for its normal discharge operation when the door has swung down.

It will be understood that the figures show the operation of one element T for the vehicle: and that this structure is repeated for the other elements T and Ta.

Apertures 53 are provided in the outer tube member 32 to permit inspection of the position of the inner telescoping pin 31 during the assembly of the parts, so that the position and condition of the sacrifice member 40 may be determined easily.

It is preferred in the illustrated form to provide reinforcements for the car body and door adjacent the several pivots. As shown in Fig. 6, it is preferred to form the car floor 15 with downwardly bent lateral edges forming flanges for cooperation with the door in guiding the material. The car bottom 15 is cut away opposite each pivot 21 for the door, and is provided at such points with the reinforcing members having the side walls 16x as described above, these reinforcing members being preferably in the form of boxes to add strength and to prevent the access of dirt to the operating portions of the door control system: and as illustrated in Figs. 2, 3 and 6, the short upwardly bent end, in the illustrative form, of the transverse arm T extends upwardly into this box.

The door itself is reinforced by longitudinal ties 19x (Fig. 6), while a scraper 19c is provided to fit closely to the curvature of the edges of body bottom 15, which in turn is substantially concentric with the hinge pivot 21: whereby to prevent the sifting of the material from the car body beneath the door plate 20. The depending flange of the body bottom 15 is reinforced by the plates 15x and the tie plates 15p, the latter being doubled and formed with an upstanding stop for the lug 24 at the bottom of the door. At the slotted point of the bottom 15 the latter may receive the stiffening box members 16m formed rigidly with the gusset plates 16x (Figs. 2 and 3) and having the shoe portions 21x engaging the periphery of the cylindrical sleeves 21s of the door supports 19, 22. The gusset plate 16x may also be stiffened by the webs 16w (Fig. 6) on the sides opposite the telescoping members 31, 32.

In the preferred form of arrangement of parts, illustrated in the present example, the links 31, 32 may be removed and replaced for substituting a new sacrifice member 40 when the door is about one-third of the way open, as shown in Fig. 6. It will be noted, further, that the crushing of the tube 40 occurs until the end of the outer member 32 is stopped by the double thickness of the crushed tube 40 and the stop 41 on the inner member 31. This represents an opening of the door plate 20 of about 15°, or in other words, the car remains capable of holding the major portion of its contents, even though the sacrifice member is permanently deformed. It will be understood, however, that this is an abnormal operation of the car; and in fact an operator can usually stop the return movement of the body before a permanent deformation of the element 40 occurs, by reason of the elastic limit as pointed out above; and that if a slight rupture does occur, it normally is not sufficient to cause the door to remain open as much as 15°. Further, such a rupture usually occurs when a part of the load has been dumped, and it is desired to return the body to the normal transport position: in which event the present arrangement affords a safeguard against a major injury to the car, such as ripping of a door from the car body.

The location of the pivot pins 23 with respect to the depending portion of the car body may be selected as desired: and in the particular illustration, the pin is shown to be free of the body flange when the door is closed (position of Fig. 2), and when such a location is selected for the pins 23, the pads 23a (Figs. 1 and 3) are provided with the edges in extension of the slots through these body flanges which receive the depending arms 22 of the door member. These pads 23a therefore form in effect an extension of the plates 16x, and prevent the endwise movement of the pins 23 when the doors are in closed position.

It will be understood that the illustrative example is merely one form of embodiment of the present invention: and that the invention is not limited to the specific form in which a tubular sacrifice member is employed to respond to strains by springing, crushing, and breaking under successively increased loads; nor to employment with vehicles having laterally spaced body fulcrums as shown by the illustration; nor to other illustrative details: but that the invention may be employed in many ways within the scope of the appended claims.

What I claim as new and desire to secure by Letters Patent is:

1. In a dump vehicle, a frame, a dump body mounted on the frame to be tiltable for dumping to the side, a side door pivoted to said body and adapted to open during the tilting of the body whereby the load may be discharged, and a door controlling device operated by the relative movement of the body and the frame during the return of the body to normal transport position whereby to positively move the door to closed position, said device including a sacrifice member adapted to yield when the door is blocked, and also including means to establish a positive connection between said frame and door to positively open said door after a predetermined relative movement of said body and frame.

2. In a dump vehicle, a frame, a dump body mounted in stable equilibrium during transport on said frame for tilting about laterally spaced fulcrums, side doors pivoted to said body and adapted to open during the tilting of the body about the adjacent fulcrum, and automatic and independent door controlling devices for said doors each including a member carried by the body and engaged directly with the frame during transport and during tilting about the adjacent fulcrum and moving bodily with the body during tilting about the opposite fulcrum, said devices also each including control means for connecting said member and the associated door and operating during transport and during tilting about the opposite fulcrum to hold the associated door closed and during return of the body from tilted position to positively close the door and including a loose connection whereby the door is free at all times to make a predetermined relative closing movement with respect to the body during tilting and means for producing a positive opening movement of the door after a predetermined relative tilting of the body with respect to the frame.

3. In a dump vehicle, a frame, a dump body mounted on the frame to be tiltable for dumping, a side door pivoted to said body and adapted to open during the tilting of the body whereby the load may be discharged therethrough, and a door controlling device operated by the relative movement of the body on the frame to positively close the door during the return of the body from tilted position, said device including a sleeve member and a pin member engaged with each other and acting in compression to close the door, said pin member having a slot therein, and a movement limiting pin passing through said sleeve member and slot, said sleeve member and pin member thereby having a permissive relative movement whereby the door may close relative to the body, said movement limiting pin operating upon the completion of a relative extension of said sleeve member and pin as determined by the length of said slot to exert a positive opening movement upon said door during the tilting of the body.

4. In a dump vehicle, a frame, a dump body mounted on the frame to be tiltable for dumping, a side door pivoted to said body and adapted to open during the tilting of the body whereby the load may be discharged therefrom, a door controlling device operated by the relative movement of the body on the frame to positively close the door during the return of the body from tilted position, said device including a sleeve member and a pin member engaged with each other and acting in compression to close the door, a sacrifice tube located between said members and adapted to yield when the door is locked against closing whereby to avoid breakage of another part of the vehicle, said pin member having a slot therein, and a movement limiting pin passing through said sleeve member and the slot in said pin member and establishing a positive connection therebetween whereby to produce a positive opening movement of the door following a predetermined relative movement of said sleeve and pin members.

5. In a dump vehicle, a frame, a dump body mounted on the frame to be tiltable for dumping, a side door pivoted to said body and adapted to open during the tilting of the body whereby the load may be discharged therethrough, and a door controlling device operated by the relative movement of the body and frame to positively close the door during the return of the body from tilted position, said device including a sleeve member and a pin member engaged with each other and acting in compression to close said door, said members being adapted to move relatively one with respect to another whereby to permit a relative closing of the door with respect to the body, and means carried by said sleeve member to limit said relative movement of said sleeve and pin members.

6. In a dump vehicle, a frame, a dump body mounted on the frame to be tiltable for dumping, a side door pivoted to said body and adapted to open during the tilting of the body whereby the load may be discharged, and a door controlling device operated by the relative movement of the body and the frame to positively close the door during the return of the body from tilted position, said device including a sleeve member and a pin member engaged with each other and acting in compression to close the door, a sacrifice tube located between said members and adapted to yield resiliently under compression when the door is blocked against closing whereby to avoid a breakage of another part of the machine, and a pin passing through the said sleeve member and said sacrifice member and engaging said pin member, said pin retaining the sacrifice member in position and also limiting the relative extension of said sleeve and pin members.

7. In a dump vehicle, a frame, a dump body tiltable for dumping to either side about fulcrums at the side of said frame, said dump body being supported in stable equilibrium upon said fulcrums during normal transport, side doors for said dump body pivoted thereto and independent, automatic and selective door controlling devices for said doors located beneath said body and extending across the frame, each of said devices including mutually telescoping members to control a permissive opening by gravity of the associated door during the tilting of said body about the adjacent fulcrum, and to permit a relative closing of the door with respect to the body when the door is blocked against movement during the tilting of the body by the extension of said telescoping members, and means to limit the extension of said telescoping members after a predetermined relative movement whereby a positive opening movement is exerted upon said door.

8. In a dump vehicle, a frame, a dump body mounted on the frame to be tiltable for dumping to either side of the vehicle, side doors pivoted to said body and adapted to open downwardly during the tilting of the body whereby the load may be discharged thereover, and door controlling devices operated by relative movement of the body on the frame to determine an opening of the respective door in proportion to the tilting of the body, said device including a sacrifice member adapted to yield when the door is blocked whereby to avoid a breakage of another part of the vehicle, and also including means permitting a predetermined relative closing movement of the door with respect to the body and thereafter operating to produce a positive opening movement of the door with respect to the body.

9. In a dump vehicle, a frame, a dump body tiltable for dumping to either side about fulcrums at the side of said frame, said dump body being supported in stable equilibrium upon said fulcrums during normal transport, side doors for said dump body pivoted thereto and independent, automatic and selective door controlling devices for said doors located beneath said body frame, each of said devices including mutually telescoping members to control a permissive opening by gravity of the associated door during the tilting of the said body about the adjacent fulcrum, and to permit a relative closing of the door with respect to the body when the door is blocked against movement during the tilting of the body by the extension of said telescoping members, and means to limit the extension of said telescoping members after a predetermined relative movement whereby a positive opening movement is exerted upon said door.

10. In a dump vehicle, a frame, a dump body mounted on said frame in stable equilibrium during transport for tilting movement about widely spaced fulcrums, side doors pivoted to said body and adapted to open during the tilting of the body about the adjacent fulcrum, automatic door controlling devices for said door including members carried by the body and engaged directly with the frame during transport and during tilting about the adjacent fulcrum, and moving bodily with the body during tilting about the apposite fulcrum, said devices also each including control means for connecting said member and the associated door and operating during transport and during tilting about the opposite fulcrum as the sole means for holding the associated door closed and operating during return of the body from tilted position to positively close the door and including a loose connection whereby the door is free at all times to make a predetermined relative closing movement with respect to the body during tilting, and means for producing a positive opening movement of the door after a predetermined relative tilting of the body with respect to the frame.

11. In a dump vehicle, a frame, a dump body mounted on said frame in stable equilibrium during transport for tilting about widely spaced fulcrums, downfolding side doors pivoted to said body to be free at all times to open by gravity during the tilting of the body about the adjacent fulcrum, and automatic door controlling devices for said doors each including control means operating as the sole means for holding the associated door closed during transport and during tilting about the opposite fulcrum, and operating during return of the body from tilted position to positively close the door, each said means including a loose connection whereby the door is free at all times to make a predetermined relative closing movement with respect to the body during tilting, and means for producing a positive opening movement of the door after a predetermined relative tilting of the body with respect to the frame.

HENRY FORT FLOWERS.